(12) United States Patent
Besselmann et al.

(10) Patent No.: US 11,404,968 B2
(45) Date of Patent: Aug. 2, 2022

(54) CURRENT SOURCE CONVERTER WITH DYNAMICAL FIRING ANGLE DETERMINATION

(71) Applicant: ABB Schweiz AG, Baden (CH)

(72) Inventors: Thomas Besselmann, Birmenstorf (CH); Pieder Jörg, Domat/Ems (CH)

(73) Assignee: ABB SCHWEIZ AG, Baden (CH)

( * ) Notice: Subject to any disclaimer, the term of this patent is extended or adjusted under 35 U.S.C. 154(b) by 223 days.

(21) Appl. No.: 16/598,178

(22) Filed: Oct. 10, 2019

(65) Prior Publication Data

US 2020/0044576 A1 Feb. 6, 2020

Related U.S. Application Data

(63) Continuation of application No. PCT/EP2018/058789, filed on Apr. 5, 2018.

(30) Foreign Application Priority Data

Apr. 10, 2017 (EP) ..................................... 17165806

(51) Int. Cl.
*H02P 1/30* (2006.01)
*H02P 5/51* (2016.01)
(Continued)

(52) U.S. Cl.
CPC ........ *H02M 5/4505* (2013.01); *H02P 25/022* (2013.01); *H02P 27/06* (2013.01)

(58) Field of Classification Search
CPC .............. H02P 1/52; H02P 25/22; H02M 5/25
See application file for complete search history.

(56) References Cited

U.S. PATENT DOCUMENTS

| 4,426,611 A | 1/1984 | Espelage et al. |
| 4,460,861 A | 7/1984 | Rosa |

(Continued)

FOREIGN PATENT DOCUMENTS

| CN | 102255518 A | 11/2011 |
| CN | 104737438 A | 6/2015 |

(Continued)

OTHER PUBLICATIONS

European Patent Office, International Search Report & Written Opinion issued in corresponding Application No. PCT/EP2018/058789, dated Jul. 11, 2018, 13 pp.

(Continued)

*Primary Examiner* — Muhammad S Islam
*Assistant Examiner* — Charles S Laughlin
(74) *Attorney, Agent, or Firm* — Greenberg Traurig, LLP

(57) ABSTRACT

A thyristor bridge of an electrical converter is connected to at least one DC link and including at least one phase leg for each output phase and each phase leg being composed of two series-connected thyristor arms. The thyristor arms of a thyristor bridge are cyclically switched by: determining an upper bound for a firing angle of a thyristor arm, wherein the upper bound is determined from voltage and current measurements; and determining a firing angle for the thyristor bridge, which firing angle determines a switching time of the thyristor arm, wherein the firing angle is determined, such that it is less or equal to the upper bound.

18 Claims, 4 Drawing Sheets

(51) Int. Cl.
    *H02M 5/45*         (2006.01)
    *H02P 25/022*     (2016.01)
    *H02P 27/06*       (2006.01)

(56) References Cited

U.S. PATENT DOCUMENTS

| | | |
|---|---|---|
| 4,654,572 A | 3/1987 | Hirata |
| 4,849,870 A | 7/1989 | Heinrich |
| 5,483,140 A * | 1/1996 | Hess ................... H02M 5/4505 318/722 |
| 9,479,103 B2 | 10/2016 | Verhulst |
| 2014/0247629 A1* | 9/2014 | Crane ..................... H02M 1/08 363/35 |
| 2015/0097502 A1 | 4/2015 | Wik et al. |
| 2015/0303855 A1* | 10/2015 | Verhulst ................ F25J 1/0022 62/611 |

FOREIGN PATENT DOCUMENTS

| | | |
|---|---|---|
| JP | 2006271070 A | 10/2006 |
| WO | 2016091573 A1 | 6/2016 |

OTHER PUBLICATIONS

Kloss, A., "A Basic Guide to Power Electronics," Wiley, Chichester, New York, 1984, pp. 70-89 and pp. 168-179.

Chinese Patent Office, Office Action issued in corresponding Application No. 201880024256.2, dated Oct. 16, 2020, 13 pp.

\* cited by examiner

CURRENT SOURCE CONVERTER WITH DYNAMICAL FIRING ANGLE DETERMINATION

FIELD OF THE INVENTION

The invention relates to the field of current source converters. In particular, the invention relates to a method for switching an electrical converter, a controller and an electrical drive system.

BACKGROUND OF THE INVENTION

Current source converters, and in particular load commutated inverters, may be used as electric drives for supplying an electrical motor with energy. For example, a variable speed synchronous machine may be connected to a grid via a first thyristor bridge, an inductive DC link and a second thyristor bridge. This type of variable speed solution is often the preferred choice in high power applications, ranging from a few megawatts to over a hundred megawatts. Such applications include high-speed compressors and rolling mills.

Electric drives such as a load commutated inverter are typically employed to transform AC power of fixed frequency into AC power of varying frequency, or vice versa. The AC power of fixed frequency is provided by an electric grid, while the AC power of varying frequency is used to drive an electric AC machine such as a synchronous machine. By means of electric drives it is possible to control the drive torque and thus to operate the AC machine at selectable speeds. Varying the speed of the machine may have several advantages compared to fixed-speed operation, one being the ability to save energy by running the machine at lower speeds.

In most configurations, the frequency transformation is carried out in a two-step approach: first, the AC power of fixed frequency is rectified to DC power and subsequently the DC power is inverted into AC power of the desired frequency. In the power generation mode, the power flow is reversed and the varying-frequency AC power of the machine is rectified to DC power and subsequently inverted into fixed-frequency AC power of the grid.

While the term load commutated inverter may refer to the thyristor bridge on the machine side in motoring mode, also an entire AC-DC-AC converter may be called load commutated inverter.

There exist a number of established control solutions for the operation of load-commutated inverters. Three control variables of a synchronous machine supplied by a load-commutated inverter are the firing angle for the line side, the firing angle for the machine side and the excitation of the synchronous machine. Firing logics, or modulators, translate the firing angle into firing commands for the single thyristors. Separate controllers may operate in parallel to select the values of the three control inputs. An excitation controller regulates the rotor excitation in order to control the stator voltage in dependence of the speed of the synchronous machine. A current controller may adapt the firing angle on the line side of the converter in order to regulate the current flowing through the DC link. A power factor controller may select the machine side firing angle in order to achieve a predetermined power factor on the machine side of the converter. This power factor is typically a function of the DC current, and is precalculated and stored in a lookup table.

The basic drawback of such a precomputation approach may be that it is by nature conservative. The operating conditions of the electrical drive are typically not fully taken into account, and instead a significant buffer is incorporated in order to guarantee operation of the electrical drive under all operating conditions.

In U.S. Pat. No. 4,426,611, a control system for a dual winding synchronous machine fed by a load commutated inverter with two DC links is described. The machine side firing angles are determined by a lookup table of the torque reference, adapted by another lookup table of the DC current error. The former lookup table can be adapted in the case of a stator overvoltage.

In U.S. Pat. No. 4,460,861, a control system for a single winding synchronous machine fed by a load commutated inverter is described. By establishing relations between the torque and the DC current, between the rectified DC voltage and the speed, and between the excitation voltage and the speed, the machine side firing angle and the commutation angle are determined as a function of the drive torque.

In U.S. Pat. No. 4,654,572, a procedure for selecting the machine side firing angle for a load commutated inverter feeding a dual winding synchronous machine is described. The selection is based on a calculation of the length of the commutation window.

WO 2016/091 573 A1 relates to a control method for a load commutated inverter and describes that firing angles are determined and afterwards are modified. Furthermore, the determination of a lower bound for a firing angle is mentioned.

DESCRIPTION OF THE INVENTION

It is an objective of the invention to provide a control method for a current source converter, which is easy to implement and results in a high power factor. Further objectives of the invention are to increase a drive efficiency, to reduce the harmonic content of line side currents and/or of an air gap torque for an electrical machine supplied by the current source converter.

These objectives are achieved by the subject-matter of the independent claims. Further exemplary embodiments are evident from the dependent claims and the following description.

A first aspect of the invention relates to a method for switching a thyristor bridge of an electrical converter, the thyristor bridge being connected to at least one DC link, possibly with an inductor, and comprising at least one phase leg for each phase, each phase leg being composed of two series-connected thyristor arms. The electrical converter may be seen as a load commutated inverter and/or a current source converter. The electrical converter may be a power converter adapted for converting currents of more than 10 A and/or more than 1 kV. In particular, the electrical converter may be adapted to process an electrical power of more than 100 kW.

For example, the electrical converter may comprise a first thyristor bridge and a second thyristor bridge, which are interconnected by a DC link, possibly with an inductor. A single thyristor bridge may be seen as a load commutated converter and/or a current source converter.

A thyristor bridge may comprise a phase leg for each output phase of the electrical converter. A phase leg may comprise an upper arm and a lower arm, each of which provides a switch, which, in the present case, is provided by one or more thyristors. These switches are connected in series to provide a phase output between them. In the case of more than one thyristors per arm, the thyristors may be connected in series and/or in parallel in an arm. Each thyristor arm may be equipped with a single thyristor only. In the following, the terms thyristor and thyristor arm may be used interchangeably.

In motor mode, a line side bridge may be a rectifier and in generator mode, a lines-side bridge may be an inverter. Conversely, in motor mode, a machine side bridge may be an inverter and in generator mode, a machine side bridge may be a rectifier.

The method may be performed by a controller, which is adapted for generating switching signals (i.e. firing signals) for the thyristor arms.

According to an embodiment of the invention, the thyristor arms of a thyristor bridge are cyclically switched by: determining an upper bound for a firing angle of the thyristor bridge, wherein the upper bound is determined from voltage and current measurements, for example in the electrical converter; and determining a firing angle for the thyristor bridge, which firing angle determines the switching time of the thyristor arms, wherein the firing angle is determined, such that it is less or equal to the upper bound.

Usually, the electrical converter has a multiple of six thyristor arms, and cyclically switching may mean that during a cycle, each of the thyristor arms is switched one time. Furthermore, every cycle the thyristor arms may be switched in the same order.

For each thyristor arm, the switching time instant is determined from a firing angle, which is based on a dynamically and/or online determined variable upper bound. The upper bound for the firing angle may vary between thyristor arms, thyristor bridges and/or cycles. The firing angle may be provided relative to a phase angle of the phase-to-phase voltage of the phases, which are commutated by the firing of the thyristor arm.

It should be noted that instead of the term firing angle, also the term switching time may be used.

In general, a thyristor can be either in a conducting state or in a blocking state. The two states refer to current being conducted or blocked by the thyristor. Current may flow through a thyristor in one direction only. A blocked thyristor can be switched to the conducting state (also called turn-on), if the voltage across the thyristor is positive and a firing command is applied to the gate of the thyristor. However, a conducting thyristor cannot be switched from its conducting state to its blocking state (which is called turn-off) by means of a gate command. Instead, a negative voltage has to be applied across the thyristor and no current must flow through the thyristor for it to switch to its blocking state.

A thyristor multi-phase bridge usually comprises two or three phase legs, which are composed of two thyristor arms connected in series. The phase legs are connected in parallel between a positive potential and a negative potential, which are provided by the DC link. The firing angle of a thyristor multi-phase bridge may determine when the thyristors are fired with respect to the angle of the multi-phase voltage provided by the thyristor multi-phase bridge. When considering a phase-to-phase voltage, the firing angle is defined as the phase difference between the zero crossing of the phase-to-phase voltage and the beginning of the commutation between the two phases. With a firing angle of zero degrees, the thyristor multi-phase bridge behaves like a diode bridge, i.e. the phase with the highest voltage is connected to the positive potential on the DC side of the multi-phase bridge, whereas the phase with the lowest voltage is connected to the negative potential of the multi-phase bridge. By selecting the firing angle of a thyristor multi-phase bridge, the sequence and frequency of the firings of its thyristor arms may be determined.

In the case that the thyristor bridge controlled with the method is on the machine side of an electrical drive, the firing angle may influence two quantities in the system directly: the rectified DC voltage applied to the DC link inductance, and the phase shift between the stator voltage and the stator current of the electrical machine, and thus the power factor on the machine side. These two quantities again may have further influence: The rectified DC voltage may influence the rate of change of the DC current, and the power factor on the machine side may determine the air gap torque in the machine. A higher power factor is generally beneficial, since it results in less reactive power, lower losses, higher efficiency, less harmonics and the ability to deliver more power to the machine.

In the case that the thyristor bridge controlled with the method is on the line side, the harmonic content of the line current may be controlled and/or lowered with the firing angle.

In both cases, it may be beneficial, when the firing angle in inverter mode with power flow from DC to AC is selected as high as possible, i.e. that the thyristor arm is switched as close to the time, when the commutation takes place. However, a too high firing angle may cause a so-called misfiring of a thyristor arm. A misfiring may happen, when insufficient negative voltage is applied to a thyristor arm for it to switch to its blocking state. Subsequently, both thyristor arms attached to a single phase may be conducting resulting in short-circuiting the DC link. Followed by a quick rise of the DC link current, misfiring may often result in overcurrent situations, such that the electrical converter is tripped and operation is stopped.

A second difficulty in selecting the firing angle may arise due to the value of the rectified DC voltage: In order to keep the DC link current constant, the rectified DC current on one side of the DC link may have to be at least as high as the rectified DC current on the other side of the DC link. This constraint may require a reduction of the firing angle on a thyristor bridge used as inverter in order to match an achievable voltage of a rectifier bridge in certain operating points, such as a reduced grid voltage and/or high motor stator voltages.

Thus, the method proposes to determine a maximal possible firing angle, i.e. the upper bound and to use this upper bound for determining the actual firing angle. As mentioned above, it is beneficial to determine an upper bound of the firing angle, which may prevent a misfiring of the thyristor arms and/or that the rectified DC voltage on one side of the DC link is low enough to not adversely affect the regulation of the DC link current.

On the other hand, the firing angle applied to the thyristor arms may be determined subject to the objective that the power factor at the stator is as high as possible, however may be limited to the upper bound.

It should be noted that a difference of a few degrees in the firing angle may have a significant influence on the operating point of the electrical converter.

In general, an increased firing angle on the inverter side and/or for a thyristor bridge in inverter operation may result in a number of technical benefits, such as reduction of power consumption, higher efficiency, less harmonics, less audible noise, higher efficiency and the possibility of boosting the power of existing installations. All these benefits may be achieved, when the electrical converter (i.e. rectifier plus inverter) is controlled with the method as described in the above and in the following.

In particular, the upper bound for the firing angle in inverter operation is determined, such that the upper bound together with a time window, which is at least the sum of a commutation time window and a recovery time window of a thyristor arm, is less or equal to 180° and that the time window is less or equal 360° divided by the number of cyclically switched thyristor arms. As already mentioned, the upper bound may be determined online from measurements in the electrical converter. The time window, which starts with the firing of the thyristor arm, may be as long, such that the commutation between the phases and the recovery of the thyristor arm surely can take place. The upper bound for the firing angle is determined by the duration of the commutation and the subsequent recovery of the thyristor arm. Additionally, the upper bound together with the time window may not be longer than 180°; i.e. the switching should take place such that the time window is ended before the phase-to-phase voltage between the phases that are commutated by the thyristor arm falls below 0 V. Also, the time window may be smaller than 360° divided by the number of thyristor arms that are cyclically switched, i.e. the switching should take place, before the next thyristor arm in the cycle is switched.

It has to be noted that instead of adapting the firing angle such as to result with a certain (constant) margin for the commutation and/or thyristor recovery to take place, the time window may be calculated explicitly as a function of the current operating point of the electrical converter. By taking into account factors, which influence the length of the time window, a less conservative approximation of the firing angle can be determined. A worst-case handling of the time window is replaced by a handling based on the actual case.

According to an embodiment of the invention, the commutation time window and/or the recovery time window are dependent on the firing angle. The commutation time window and/or the recovery time window may depend on the state of the electrical converter, in which the thyristor arm is fired. Thus, the length of the commutation time window may be determined based on the actual state of the electrical converter.

According to an embodiment of the invention, the upper bound is maximized, such that the upper bound together with the time window is less or equal to 180° and that the time window is less or equal 360° divided by the number of cyclically switched thyristor arms. The upper bound may be determined with a maximization method, in which the upper bound is maximized based on one or more constraints on the upper bound. The constraints may be based on the time window, which beginning determines the switching of the thyristor arm.

According to an embodiment of the invention, the commutation time window depends from at least one of phase-to-phase voltages between output phases of the electrical converter, a DC link current and the firing angle. For example, the duration of the commutation time window may be calculated online as a function of the stator voltage, the stator current and/or the firing angle.

According to an embodiment of the invention, the recovery time window depends on at least one of a change in a DC link current, a change of a voltage applied to the thyristor arm during switching and/or a thyristor junction temperature. For example, the duration of the thyristor recovery time window may be calculated online as a function of the stator voltage, the stator current, the thyristor junction temperature and/or the firing angle.

For example, since a change in a DC link current usually depends on the firing angle, also the recovery time window may depend indirectly on the firing angle.

The thyristor junction temperature may be estimated from the thyristor current, the thyristor voltage and/or the ambient temperature. Furthermore, the thyristor junction temperature may be determined based on temperature measurements inside the module accommodating the thyristor.

In general, the firing angle may be determined by a controller, which operates in two stages. In a first stage, the upper bound for the firing angle is determined and in a second stage, the firing angle is determined. In the second stage, the already determined upper bound is used. The second stage may be implemented in different ways.

According to an embodiment of the invention, the firing angle for a thyristor arm is determined by setting the firing angle to the determined upper bound for the firing angle. The determined upper bound may be applied directly as the firing angle. It may be that the upper bound is subjected to filtering, to make sure that changes of a machine side firing angle can be followed by a line side firing angle.

According to an embodiment of the invention, the method comprises: determining an unbounded firing angle based on measurements in the electrical converter, wherein the unbounded firing angle is determined independently from the upper bound; and setting the firing angle to the minimum of the unbounded firing angle and the upper bound. It also may be that a firing angle and an upper bound for the firing angle are determined independently from each other, for example in different controller modules, and that the minimum of both values is used as the firing angle applied to the electrical converter.

The calculated upper bound of the firing angle need not be used as an a-priori bound known to a controller, but may also be applied a-posteriori to limit the firing angle determined by the controller. For example, the controller may use a method that is not guaranteed to respect an upper bound.

According to an embodiment of the invention, the method comprises: determining the firing angle based on measurements in the electrical converter and the upper bound; wherein the upper bound is a constraint for determining the firing angle. A further possibility is that the upper bound determined in a first stage is used as a constraint in the second stage, in which the firing angle is determined. For example, control methods relaying on a constant upper bound may be used, in which the constant upper bound is replaced with the variable upper bound calculated online.

According to an embodiment of the invention, the firing angle is determined based on model predictive control. Model predictive control may be adapted to handle constraints that may incorporate a possible range of firing angles, which may be defined by the upper bound. Additionally, model predictive control may be adapted to determine the largest possible firing angle in the allowed range, as long as the DC current control is not affected.

The second stage of the controller may be based on model predictive control, in which a constraint in the form of the upper bound may be included easily. It has to be understood that a constraint based on the upper bound may be that a firing angle has to be less or equal the upper bound.

According to an embodiment of the invention, the firing angle is determined by: receiving a reference for a DC link current and/or a drive torque; predicting future states of the electrical converter as a function of future inputs over a time horizon of at least one time instant with a mathematical model of the electrical converter, wherein the future inputs comprise future firing angles of the thyristor arm; and determining a firing angle by minimizing an objective function, which is a function of the reference, the future states and/or the future inputs.

In general, in model predictive controls, future states of the electrical converter may be determined based on an estimated state, which is estimated from measurements in the electrical converter. The future states are determined with the aid of a model of the electrical converter, which may be encoded in the form of one or more mathematical equations in the controller. With this mathematical model, future inputs are also determined, which in the present case may include future firing angles, which may be applied to the electrical converter. In the end, the best future inputs with respect to optimization goals are determined. This may be performed with an objective function, which may be a quadratic function in a difference between the reference and the predicted quantity determined from the future states and the future inputs, such as a future estimated DC link current and/or a future estimated torque.

It may be that the future quantities are predicted for one, two or more time instants in the future. A time horizon of more than one time instant may result in better achieving the optimization goal.

Furthermore, it may be that the firing angle being less or equal the upper bound is included into model predictive control as inequality constraint.

According to an embodiment of the invention, the objective function is minimized with a quadratic programming solver. It may be that the objective function and/or the model are linearized. In such a way, the firing angle may be determined with a quadratic programming solver, which is available for implementation in a controller.

According to an embodiment of the invention, the upper bound for the firing angle is used as a constraint for the quadratic programming solver. A quadratic programming solver may be adapted to include the model of the electrical converter in the form of equality constraints and/or to include further inequality constraints, one of which may be that the firing angle is less or equal the upper bound.

According to an embodiment of the invention, after determination the upper bound is reduced by a safety margin. The determined upper bound may be lowered by a safety margin, for example to make sure that sudden changes of the operating point of the electrical converter do not result in misfiring of the thyristor arm. Such a safety margin also may ensure that in a fault case, a DC current higher than the actual DC current can be commutated, that electrical machines with a higher commutation inductance (for example due to longer cables) may also be powered by the electrical converter, and/or that a rectified DC voltage on the machine side may be smaller than a maximally possible rectified DC voltage on the line side. Furthermore, such a safety margin may account for uncertainties in the current, voltage and/or speed measurements, for uncertainties in a phase estimate of a three-phase voltage, and/or for delays in firing of the thyristor arms.

According to an embodiment of the invention, phase voltages of the electrical converter are measured and a duration of a commutation time window for a thyristor arm is determined from changes in the phase voltages, wherein the upper bound for the firing angle is determined based on the determined commutation time window. The determination of the commutation time window not only may be based on a formula, which models the length of the commutation time window based on a current state of the electrical converter, but also may be determined directly from the curve characteristics of voltages measured at the phase outputs of the electrical converter. For example, the duration of the commutation time window for two phases may be determined as the time window, in which the phase-to-phase voltage between these phases is substantially zero, i.e. smaller than a set voltage threshold.

In general, if measurements of the duration of the commutation time window are available, those measurements may be used instead of the calculated window length and/or additionally to the calculated commutation time window length, to increase the accuracy of the calculated upper bound.

According to an embodiment of the invention, phase voltages of the electrical converter are measured and a commutation inductance is determined from the measured phase voltages, wherein the upper bound for the firing angle is determined based on the determined commutation inductance. A formula for calculating the commutation time window may include the commutation inductance, which models the inductance between the commuting phases. This commutation inductance may be estimated offline or, as in the case here, may be determined online from measured phase voltages. These measurements may be used to increase an accuracy of the commutation inductance, resulting in an increased accuracy of the calculated commutation time window length.

A further aspect of the invention relates to a controller for an electrical converter, wherein the controller is adapted for performing the method as described in the above and in the following. For example, the controller may be based on a DSP and/or an FPGA. It also may be that the method is implemented at least partially in software and/or that the method is run in a processor provided by the controller.

According to an embodiment of the invention, the controller comprises: an upper bound determination stage adapted for determining the upper bound based on measurements in the electrical converter; and a firing angle determination stage adapted for determining the firing angle based on measurements in the electrical converter. The upper bound determination stage and the firing angle determination stage may be implemented in different modules of one controller and/or may be implemented in different hardware.

The upper bound determination stage may be seen as an angle limiter, which is adapted for determining an upper bound on the firing angle. The upper bound determination stage may calculate the length of the commutation window and/or the length of the turn-off or recovery time window to determine an upper bound for the firing angle. The calculations may be performed repeatedly online, taking into account the factors that influence the value of the upper bound at the current operating point. These factors may include the DC link current, the stator voltage, the rotor speed and the temperature of the thyristors.

The firing angle determination stage may be concerned with the determination and/or selection of the firing angle from within the range of angles, which is defined by the upper bound. This determination and/or selection may be performed by a torque and/or current controller, which may be based on model predictive control. Alternatively, if the firing angle determination stage is not capable to respect constraints explicitly, the upper bound determined by the angle limiter may be applied a-posteriori to the firing angle determined by the firing angle determination stage, for example to ensure that misfiring does not take place.

A further aspect of the invention relates to an electrical drive system, which comprises a controller as described in the above and in the following. The electrical drive system may be seen as a current source converter system. It has to be understood that features of the method as described in the above and in the following may be features of the controller and/or the drive system as described in the above and in the following, and vice versa.

The electrical drive system may furthermore comprise a line side bridge for rectifying an input multi-phase current; a machine side bridge for generating an output multi-phase current; and a DC link, possibly with an inductor, interconnecting the line side bridge and the machine side bridge; wherein the line side bridge and/or the machine side bridge are thyristor bridges and wherein the controller is adapted for controlling the line side bridge and/or the machine side bridge.

The controller may control either the line side bridge or the machine side bridge. It also may be that the controller may control both the line side bridge and the machine side bridge. It has to be understood that in the case of the line side bridge, the input phases to the electrical grid also may be seen as phase outputs, in particular, when power flows from the electrical machine towards the electrical grid, which is supplied by the line side bridge.

For example, a bridge solely used as rectifier may be based on diodes, i.e. may be a diode rectifier.

According to an embodiment of the invention, the line side bridge and/or the machine side bridge comprises two or more multi-phase bridges, such as three-phase bridges. The line side bridge and/or the machine side bridge may comprise one multi-phase bridge or may have a different number of such bridges in series and/or in parallel, on the line side and/or on the machine side, respectively.

According to an embodiment of the invention, the current source converter may have more than one DC link, the DC link may contain an inductor or may not contain an inductor and/or the DC link inductance may be negligible.

According to an embodiment of the invention, the current source converter may only comprise one thyristor bridge. For example, the converter described in the below may be reduced to one if its thyristor bridges, i.e. the DC link and the rectifier may be replaced by a DC current source, and phases of the thyristor bridge may be connected to an AC voltage source, possibly with inductive properties, instead of an electric machine. For example, the current source converter may be a terminal of an HVDC station.

According to an embodiment of the invention, the electrical drive system further comprises a synchronous electrical motor supplied by the inverter. By switching the thyristors of the inverter, the controller may control the speed of the electrical motor, which may be used in an industrial environment, for example for driving a pump or a turbine. However, it also may be that the electrical motor is operated in a generator mode and generates electrical power that is supplied to an electrical grid via the electrical converter.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

Detailed Description of Exemplary Embodiments

System Overview

Figure 1:
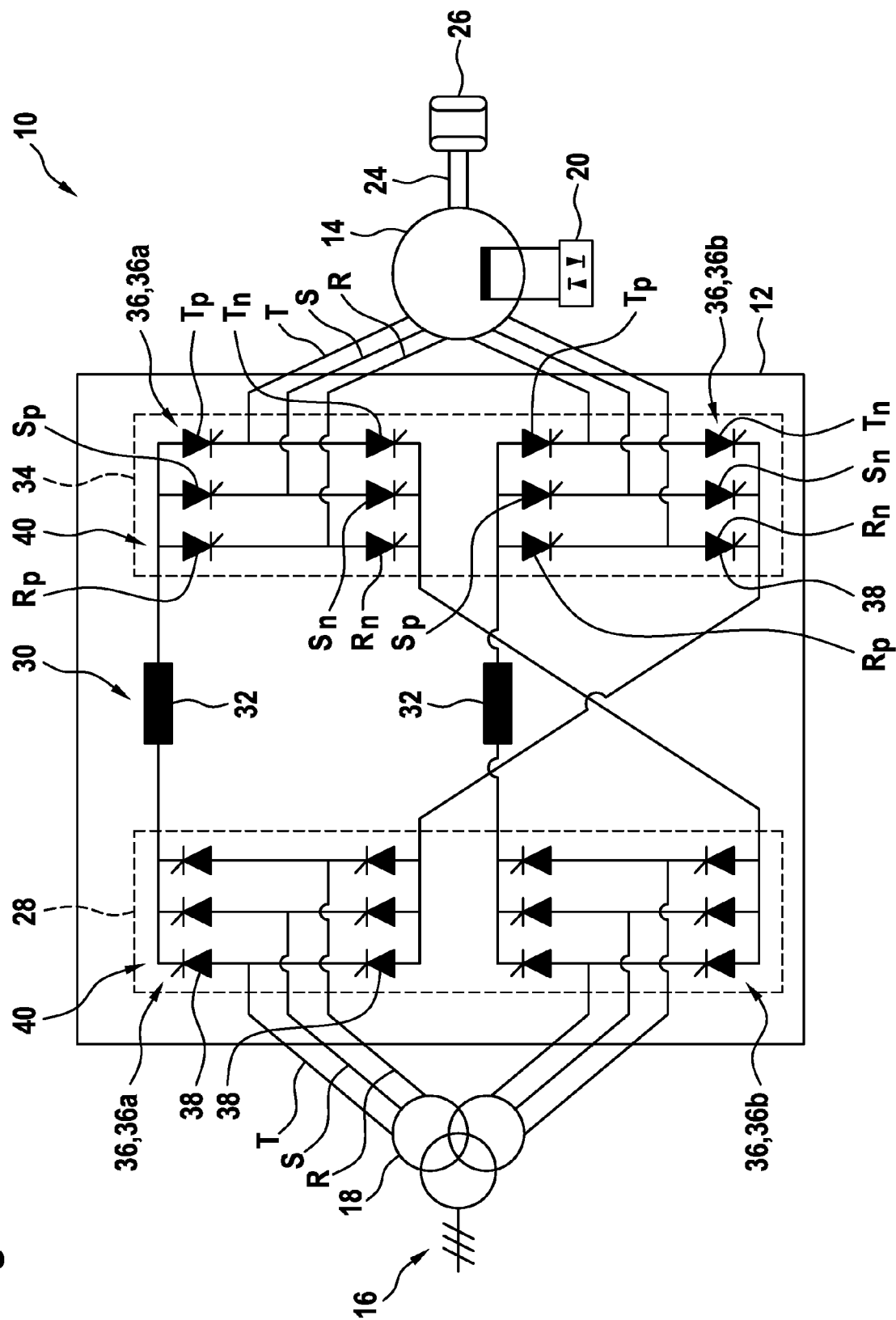
FIG. 1 schematically shows an electrical drive system according to an embodiment of the invention.

FIG. 1 shows an electrical drive system 10 comprising an electrical converter 12 for converting a multi-phase AC current from an electrical grid 16 into a multi-phase current to be supplied to an electrical machine 14. It may be that the power flow through the converter 12 is from the grid to the electrical machine 14 or vice versa from the electrical machine 14 to the grid 16.

The load-commutated converter 12 is connected to the grid 16 via a transformer 18, which transforms a three-phase current from the grid 16 into a current with two pairs of three phases. On the machine side, the converter 12 also generates a current with two pairs of phases, which are supplied to the double-winding synchronous machine 14.

The rotor of the electrical machine 14 is excited by means of an excitation system 20 and/or is attached to a drive shaft 24 and some machinery 26, such as a pump or turbine.

The converter 12 comprises a line side bridge 28, a DC link 30 with inductances 32 and a machine side bridge 34. Both the line side bridge 28 and the machine side bridge 34 are in a so-called 12-pulse configuration, meaning that they each consist of two three-phase bridges 36 with six thyristor arms 38. For the line side bridge 28 and the machine side bridge 34, the first and second three-phase bridges are indicated as 36a and 36b.

Each three-phase bridge 36 comprises three phase legs 40, each of which comprises an upper arm 42a and a lower arm 42b in the form of a thyristor arm 38. The phase legs 40 are connected in parallel at the side of the DC link 30 and provide a midpoint between the two arms 42a, 42b to which the corresponding phase of an AC current is connected.

It has to be noted that here and in the following one thyristor arm 38 may comprise one, two or more thyristors that are connected in series and/or in parallel and that are switched simultaneously.

The positive sides of the two three-phase bridges 36a, 36b of the line side bridge 28 are connected via inductors 32 of the DC link 30 with the positive sides of the two three-phase bridges 36a, 36b of the bridge 34. The negative sides of the two three-phase bridges 36a, 36b of the line side bridge 28 are connected crosswise with the negative sides of the two multi-phase bridges 36a, 36b of the bridge 34, such that a negative side is connected with the other one of the three-phase bridges as the positive side.

The double-winding synchronous machine 14 has two sets of three-phase windings, mounted at a phase difference of 30° towards each other. Without loss of generality, it is assumed in the following, that the stator voltage applied to the multi-phase bridge 36b lags the stator voltage at the multi-phase bridge 36a by 30°.

While the system 10 shown in FIG. 1 comprises a converter 12 with 12-pulse configuration, other configurations are also possible, such as a 6-pulse, 18-pulse or 24-pulse configuration. For example, the converter 12 of FIG. 1 may comprise one, two, three or more multi-phase bridges 36 on the line side and/or the machine side. The pulse number may be calculated by the number of multi-phase bridges 36 multiplied with 6.

In the configuration shown in FIG. 1, the stator voltage from the three-phase bridge 36b may lag the stator voltage from the three-phase bridge 36a by 30 degrees. By operating two three-phase thyristor bridges 36a, 36b phase-shifted by 30 degrees, the harmonics in the drive torque may be reduced. The name 12-pulse configuration stems from the fact that for each AC voltage period on an AC side of the converter 12, each thyristor arm 38 is fired once, resulting in twelve pulses per period. For the three-phase bridges 36 of the machine side bridge 34, the thyristor arms 38 are additionally indicated as Rp, Sp, Tp, Rn, Sn, Tn connecting the phases R, S and T to the positive and negative potential of the DC link 30. The thyristor arms 38 of the three-phase bridges 36 of the line side bridge 28 may be named analogously.

Figure 2A:
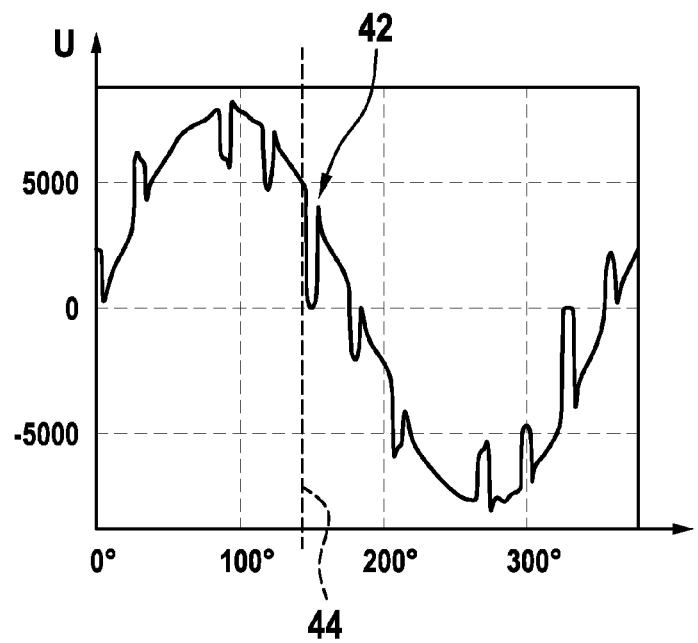
FIGS. 2A and 2B show diagrams with phase-to-phase voltages of the electrical drive system of FIG. 1.
Figure 2B:
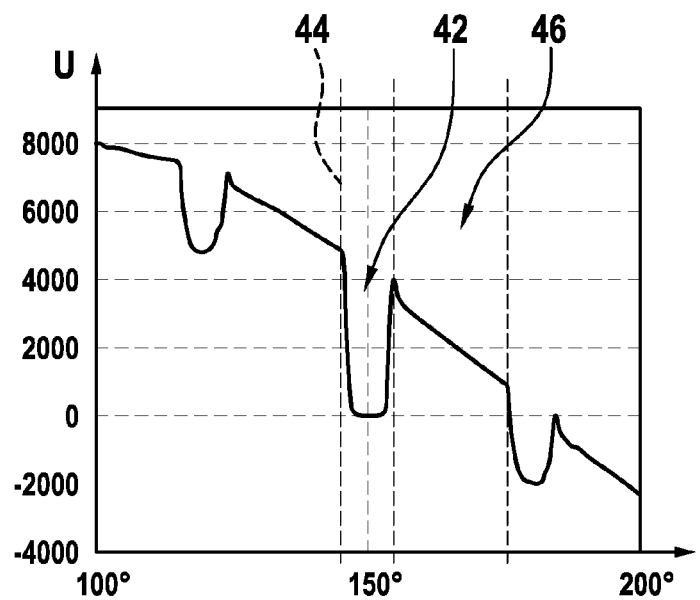

FIG. 2A shows a machine side phase-to-phase voltage U. FIG. 2B shows a section of FIG. 2A in more detail. The voltage U is provided in V. In FIG. 2A, the voltage U is depicted via the phase angle of one period of 360°, i.e. over one rotation of the rotor. FIG. 2 shows the section between 100° and 200°.

FIGS. 2A and 2B show a commutation time window 42, due to a commutation between the phases for which the phase-to-phase voltage is shown. The commutation is due to a firing of a thyristor arm 38 at a firing angle 44. In this example, the firing angle for the thyristor arm 38 is 145° degrees, when both phases are short-circuited until the current conduction is transferred from one phase to the next. This process is called commutation, and the commutation time window 42 may be the time window, when the phase-to-phase voltage U is substantially zero. The length of the commutation window 42 may also be denoted as commutation length, commutation time or commutation angle.

The other indentions in the voltage U are due to commutations between other phases. However, during one period, one thyristor arm may be fired only once and therefore, there may be only one commutation time window 42 per period.

Directly after the commutation time window 42, the turn-off or recovery time window 46 starts: The turned-off thyristor arm 38 requires some recovery time with a negative thyristor voltage (which corresponds to a positive phase-to-phase voltage), in order to regain its blocking state. In other words, both the commutation time window 42 and the recovery time window 44 must be finished before the phase of the stator voltage becomes negative. The length of the recovery time window 46 may also be denoted as turn-off time, turn-off angle recovery time or recovery angle.

The lengths of the commutation time window 42 and of the recovery time window 46 depend on the current state of the electrical drive system 10, in particular on the phase voltages in the phases R, S, T, the DC link current, a junction temperature of one or more thyristors of the thyristor arm 38 and/or the firing angle 44.

Control System

Figure 3:
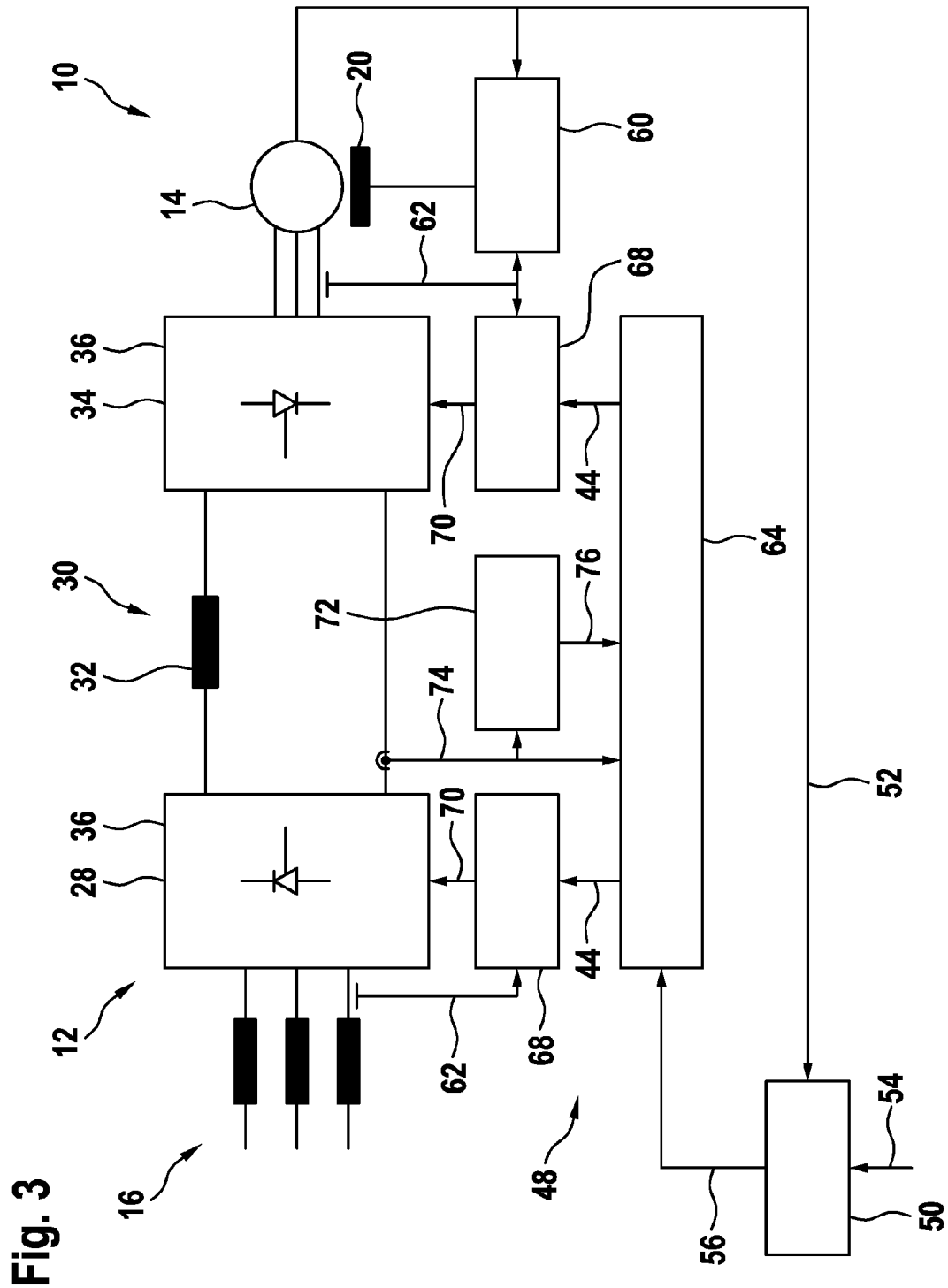
FIG. 3 schematically shows a controller according to an embodiment of the invention.

FIG. 3 shows an electrical drive system 10 with an electrical converter 12, with a line side bridge 28 and a machine side bridge 34 interconnected by a DC link 30. In FIG. 3, only two three-phase bridges 36 are shown. However, the electrical converter 12 may be designed like the one shown in FIG. 1.

FIG. 3 furthermore shows a controller 48 with several control modules and/or control stages for controlling the electrical drive system 10. The modules and/or stages may be implemented in one control unit or in several control units, i.e. in the same or different hardware devices.

A speed controller stage 50 receives the actual speed 52 of the electrical machine 14 and a reference speed 54 and determines a reference 56 for a firing angle determination stage 58. For example, the reference 56 may be a reference torque and/or a reference DC link current. The actual speed 52 is also supplied to an excitation controller stage 60 that controls the excitation system 20 of the electrical machine 14. In addition, measurement values of phase voltages 62 measured in the output phases of the converter 12 are supplied to the excitation controller stage 60.

The reference 56 of the speed controller 50 is supplied to a firing angle determination stage 64, which determines firing angles 44 for the thyristor bridges 28, 34. The firing angles 44 are supplied to firing logic stages 68, which determine firing signals 70 from the firing angles. In addition, voltage measurements of phase voltages 62 in the output phases or input phases of the thyristor bridges 28, 34 are supplied to the firing logic stages 68, which voltage measurements are also used for determining the firing signals 70. The firing signals 70 may comprise firing instances, i.e. times, when the respective thyristor arms 38 are to be fired.

An upper bound determination stage 72 receives current measurements of a DC link current 74, which are also supplied to the firing angle determination stage 64. The upper bound determination stage 72 determines an upper bound 76 of the firing angle 44. For example, the upper bound 76 is determined, such that it permits the commutation and the recovery of the thyristor arms 38 without misfiring. Based on the current operating point of the converter 12, a maximal possible line side and/or machine side firing angle, i.e. an upper bound 76 for the respective firing angle 44, is determined. It has to be noted that the upper bound 76, determined for the line side bridge 28, usually is different from an upper bound determined for the machine side bridge 34. In this case, the upper bound determination stage 72 determines two different upper bounds.

The upper bound 76 is supplied to the firing angle determination stage 64 to support the determination of the firing angle 44. For example, the upper bound 76 may be used as a constraint, when the firing angle determination stage 64 is implemented based on model predictive control.

It has to be noted that the voltage measurements 62 of the phase voltage in the input and/or output phases also may be supplied to the firing angle determination stage 64 and/or the upper bound determination stage 72.

Alternatively, the firing angle determination stage 64 may be omitted and the upper bound(s) 76 (for the line side and/or the machine side) may be supplied directly to the firing logic stage(s) 68. As a further alternative, the firing angle(s) 44 may be determined independently from the upper bound(s) 76 and a minimum of the firing angle(s) 44 and the respective upper bound 76 may be supplied to the firing logic stage(s) 68.

Control Method

In the following, a control method for the electrical drive system shown in FIG. 1 will be described. The method may be performed by the controller shown in FIG. 3.

In general, the thyristor arms 38 of a thyristor bridge 28, 34 are cyclically switched by the respective firing logic stage 68 of the line side bridge 28 or the machine side bridge 34. Both firing logic stages 68 are provided with a firing angle 44, which determines the switching signals or switching time instants 70 of the thyristor arms. The firing angle 44 may be provided relative to a phase angle of the respective output phase, i.e. the AC phases of the line side bridge 28 or the AC phases of the machine side bridge 34.

It may be that a new value for the firing angle 44 is determined every time instant a thyristor arm 38 is switched, or for longer time intervals. For example, the control stages 64 and 68 may operate asynchronously.

Upper Bound Determination

In general, the upper bound determination stage 72 determines upper bounds 76 for firing angles 66 of the thyristor arms 38 of the line side and/or machine side bridges 28, 34. The upper bound 76 may be determined from voltage and current measurements 74, 62 in the electrical converter 12.

An objective of the upper bound determination stage 72 may be to calculate, for a current operating point of the electrical converter 12, an upper bound 76 for the firing angle 44, such that a misfiring of the thyristor arms is avoided. The upper bound 76 of the firing angle 44 may be determined by solving the following optimization problem:

$$\max_{\bar\vartheta} \bar\vartheta$$
$$\text{s.t.} \quad \bar\vartheta + t_c + t_r \le \pi$$
$$t_c + t_r \le 2\pi/n$$

Here, $\bar\vartheta$ denotes the upper bound 76 on the firing angle 44, $t_c$ the duration of the commutation time window 42 and $t_r$ the duration of the recovery time window 46 (all in radians, i.e. 180°=π). Below it will be described that both $t_c$ and $t_r$ are functions depending on the firing angle 44. n is the number of cyclically switched thyristor arms, for example n=12 for one of the thyristor bridges 28, 34 shown in FIG. 1. In general, every three-phase bridge 36 accounts for 6 thyristor arms, such that n=6m, when in is the number of three-phase bridges 36.

The constraints ensure that both commutation time window 52 and recovery time window 46 take place before the concerned phase-to-phase voltage (see FIGS. 2A and 2B) becomes negative, either because of reaching 180° degrees or because of the subsequent firing of the next thyristor arm 38.

In summary, the upper bound $\bar\vartheta$, 76 for the firing angle 44 is maximized, such that the upper bound 76 together with a time window 42, 46, i.e. $t_c+t_r$, depending on the firing angle 44 is less or equal to 180° and that the time window 42, 56 is less or equal 360° divided by the number of cyclically switched thyristor arms 38.

The time window $t_c+t_r$ may be the sum of the commutation time window $t_c$, 42 and the recovery time window $t_r$, 46 for a thyristor arm 38.

In order to calculate the upper bound $\bar\vartheta$, 76, the length of the commutation time window 42 and the recovery time window 46 of the thyristor arms 38 may need to be calculated and/or may be provided as formulas.

Figure 4:
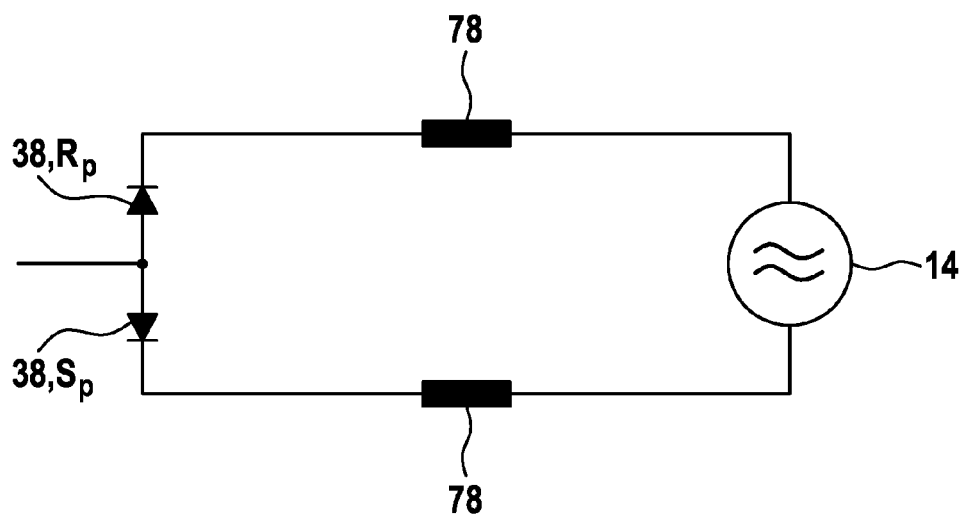
FIG. 4 shows an equivalence circuit for the commutation from one phase to another phase of the electrical drive system of FIG. 1.

For example, the calculation may be based on an equivalence model for the two commutated phases, such as shown in FIG. 4. Here, the synchronous electrical machine 14 is modeled as an AC voltage source and a commutation inductance 78 for each phase. As example, two thyristor arms 38 are denoted as Rp and Sp. During the commutation, both thyristor arms Rp, Sp are conducting and the length $t_c$ of the commutation time window 42 is the time the voltage source 14 requires to reduce the current in one phase to zero, while ramping up the current in the other phase to the DC current.

From this equivalence model, an equation for length $t_c$ of the commutation time window 42 can be derived:

$$t_c = \arccos\left(-\frac{4\pi f LI}{\sqrt{2}\,U} + \cos\vartheta\right) - \vartheta$$

In this equation, f denotes the rotor frequency (or grid frequency), L the commutation inductance 78 of each phase, I the DC link current, and $\overline{U}$ the root mean square value of the phase-to-phase voltage.

Additionally or alternatively, it may be that phase voltages 62 of the electrical converter 12 are measured and the duration $t_c$ of the commutation time window 42 for a thyristor arm 38 is determined from changes in the phase voltages 62.

Furthermore, the commutation inductance L, 78 may be determined from the measured phase voltages 62.

The length $t_r$ of the recovery time window 42 may be determined by a number of contributing factors, such as the rate of change dI/dt of the DC current during the commutation, the rate of change dv/dt of the voltage applied to the thyristor arm 38 during the switching process, or the junction temperature Tj of the thyristor. More formally, the relation can be stated as $$t_r = F\left(\frac{dI}{dt}, \frac{dv}{dt}, T_j\right)$$

The precise relation F may depend on the used type of thyristors. The rate of change dI/dt of the DC current during the commutation may depend on the operating point of the converter 12, and may be stated as $$\frac{dI}{dt} = \frac{\sqrt{2}\,U\sin\vartheta}{2L}$$

where $\vartheta$ denotes the firing angle 44.

A snubber circuit may be connected in parallel to a thyristor arm 38, limiting the rate of change of the thyristor voltage dv/dt.

Summarized, the commutation time window 42 and/or the recovery time window 46 may depend on the firing angle 44. The commutation time window 42 may depend from at least one of a phase-to-phase voltage between output phases of the electrical converter 12, a DC link current and the firing angle 44. The recovery time window 46 may depend on at least one of a change in a DC link current, a change of a voltage applied to the thyristor arm 38 during switching, and/or a thyristor junction temperature.

The temperature at the junction Tj of the thyristor arm 38 is typically not measured, however, if temperature measurements at the vicinity of the thyristor arm 38 are available, the junction temperature Tj may be estimated depending on the operating point of the converter 12, i.e. the DC current, the firing angle, the stator voltage and the rotor speed.

In the end, after determination, the upper bound $\bar\vartheta$, 76 may be reduced by a safety margin. This may be a constant value that is subtracted from the upper bound $\bar\vartheta$, 76.

Firing Angle Determination

In general, the firing angle 44 for the thyristor arm 38 is determined, such that it is less or equal to the upper bound 76. There are several possibilities, how the firing angle 44 is determined with the aid of the upper bound 76.

In a first embodiment, the firing angle 44 for a thyristor arm 38 is determined by setting the firing angle 44 to the determined upper bound 76 for the firing angle 44. In this embodiment, the stage 64 of the controller 48 is omitted.

In a second embodiment, an unbounded firing angle is based on the measurements 62, 74 in the electrical converter 12, wherein the unbounded firing angle is determined independently from the upper bound 76. In this embodiment, the upper bound 76 is not input to the controller stage 64, but the firing angle 44, which is applied to the firing logic stage 68, may be set to the minimum of the unbounded firing angle and the upper bound 76.

In a third embodiment, the firing angle 44 is determined based on measurements 62, 74 in the electrical converter 12 and the upper bound 76: In this case, the upper bound 76 may be input to the controller stage 64 and/or the upper bound 76 may be a constraint for determining the firing angle 44.

In the following, a firing angle determination stage 76 according to the third embodiment will be described.

Model Predictive Control Firing Angle Determination

The firing angle determination stage 64 may comprise a current controller to determine the firing angle 44 less or equal to the upper bound 76 provided by the upper bound determination stage 72. In model predictive control, a mathematical model of the converter 12 is employed to predict the evolution of its states, i.e. its future states, such as the DC link current over a finite time horizon as a function of the firing angles 44.

This prediction is formulated as an optimization problem with the objectives to minimize the deviation of the actual DC current from its reference 56, and/or the deviation of the actual drive torque from its reference 56. Other objectives may be the maximization of the power factor of the electrical machine 14 and/or the smooth change of firing angles 44. The objectives may be encoded into an objective function, which has to be minimized to achieve the goals. The objectives also may be weighted, while the weights of these objectives may determine a prioritization between those goals.

In the following, a possible embodiment of a possible model predictive control method is described, which may be performed by the firing angle determination stage 64. However, other implementations also may be possible.

The model predictive control may determine the firing angles 44 of both line side bridge 28 and machine side bridge 34. The control actions of line side bridge 28 and machine side bridge 34 may thus be determined by the same controller stage 64, allowing a systematic coordination of control actions.

The mathematical prediction model may be stated in ordinary differential equations of the form $$x(k+1)=f(x(k),u(k))$$

$$y(k)=g(x(k),u(k))$$

where k represents the discrete time (instants); x(k) represents the state of the converter 12 at time k; u(k) its inputs at time k such as firing angles 44; and y(k) represents the measurable outputs of the converter 12 and the synchronous electrical machine 14 at time k, such as voltages, currents or the rotational speed. While $f(.)$ is typically a non-linear function describing the dynamic behavior of the converter 12, $g(.)$ is typically a non-linear function describing how the outputs depend on the states and inputs of the converter 12.

The functions $f(.)$ and $g(.)$ have to be known a-priori, and they may be different (structural and parameter differences are possible) for each electric drive configuration. Therefore, a modeling procedure may have to be executed before operation of the proposed controller 48.

The model predictive control may be performed by a collection of software routines on a real-time computing platform. The collection of software routines may include a non-linear mathematical prediction model of the drive system 10, a quadratic programming (QP) preparation algorithm, and a quadratic programming (QP) solver.

Note that in this section only one possible embodiment is described, whereas a number of alternative embodiments exist. For instance, the non-linear optimization problem may be solved directly by means of a non-linear problem solver, or the derivation of the quadratic programming from the non-linear problem may be achieved by linearizing the mathematical prediction model at each sampling instance. Instead of solving the full non-linear problem, one may alternatively also solve a simplified problem, which still contains non-linearities such as bilinear terms. Furthermore, one may also decide to not solve the optimization problem online, but to follow a so-called explicit model predictive control approach, in which the optimization problem is solved parametrically offline and the online procedure is reduced to an evaluation of the solution for the current state estimate.

Before execution, the software routines may need to be prepared by means of an initialization phase, afterwards the software routines may be run in an on-line phase.

Initialization Phase (Offline)

In the initialization phase, the model predictive control is prepared for application to the drive system 10. This preparation may comprise two steps:
 1. providing a dynamic model of the electric drive system 10, and
 2. selecting the objectives and constraints for the electrical drive system 10.

Solving the Constrained Optimal Control Problem (On-line)

After initialization, the software routines may be executed periodically on-line in the controller stage 64, such as a real-time computing platform, for example every few hundred microseconds. The software routines may be carried out in the following sequence:

Step 1: On-Line Integration and Formulation of a Quadratic Programming (QP) Sub-Problem The first step linearizes the constrained finite-time optimal control problem to arrive at a sub-problem in form of a quadratic programming (QP), which is easier to solve than the original problem. For doing so, the non-linear model is integrated along the prediction starting at the current estimates of the initial state to determine future states. In addition, first-order derivatives of the predicted future states with respect to the initial state as well as the control inputs are determined.

This integration of the non-linear model and the computation of the first-order derivatives delivers a linearized formulation of the original model:

$$\xi(k)=A_k\xi(k)+B_ku(k)+f_k$$

$$\eta(k)=C_k\xi(k)+D_ku(k)+g_k$$

Based on this linearized model formulation, a linearized version of the model predictive control problem can be formulated, which is equivalent to a convex quadratic programming (QP):

minimize $(z-r)'Q(z-r)$ with respect to $z$ subject to $G_{in}z<=b_{in}$ and $G_{eq}z=b_{eq}$.

Therein, the states $\xi(k)$ and control input $u(k)$ are gathered at all time instants along the prediction horizon (of length p) within a vector $z=[\xi(k),u(k),\xi(k+1),u(k+1), \ldots ,\xi(k+p-1),u(k+p-1),\xi(k+p)]$ and the reference values for the future states and control inputs within a vector $r=[\xi\mathrm{ref}(k),u\mathrm{ref}(k),\xi\mathrm{ref}(k+1),u\mathrm{ref}(k+1), \ldots ,\xi\mathrm{ref}(k+p-1),u\mathrm{ref}(k+p-1),\xi\mathrm{ref}(k+p)]$.

The quadratic objective function $(z-r)'Q(z-r)$ penalizes the deviation of the predicted states and inputs z from their reference r, where Q is a positive semidefinite quadratic weight matrix used to tune the model predictive control.

The linearized model equations are incorporated into the quadratic programming (QP) problem by means of the equality constraints $G_{in}\, z<=b_{in}$, $G_{eq}$ and $b_{eq}$ may represent the linearized state-update equations over the whole prediction horizon in a compact form. Physical and/or desired limitations on the states and control inputs may be incorporated by means of the inequality constraints given by $G_{eg}$ and $b_{eg}$.

Note that the above quadratic programming (QP) formulation may be adapted to incorporate the predicted measurable outputs $\eta(k)$ instead of the predicted states $\xi(k)$.

Note further that many variations and extensions of the above-mentioned quadratic programming (QP) formulation may be provided. For example, soft constraints to avoid non-feasibilities of the optimization problem, move blocking and multiplex model predictive control may be used to reduce the size of the optimization problem.

Moreover, the objective function may comprise a linear objective term of the form $gT(z-r)$, where the gradient g is an additional tuning parameter to provide more flexibility in penalizing set-point deviations. Furthermore, instead of providing set points for the control inputs, one can also use a so-called $\delta u$-formulation, and minimize the difference between successive control inputs instead of their deviation from a given steady-state value.

Finally note that the quadratic programming (QP) problem formulation may exhibit a special sparsity structure, as it comprises optimization variables for both states and control inputs. One way to exploit this structure in terms of computational efficiency may be to employ a sparse quadratic programming (QP) solver. Another approach is to use the linearized state-update equations to remove all but the initial state $\xi(k)$ from the vector z and thus from the quadratic programming (QP) problem formulation. This may lead to a smaller-scale, but dense quadratic programming (QP) problem. This second approach may be more efficient on short prediction horizons.

Step 2: Solving the Quadratic Programming (QP) Sub-Problem and Implementation of Control Action Solving the convex quadratic programming (QP) as described in step 1 (in either form) may be done in a fast and reliable way using existing quadratic programming (QP) solvers. A quadratic programming (QP) solver may be able to solve small-scale quadratic programming (QP) problems in the range of milliseconds or less. By doing so, a possibly approximately optimal solution $z_{opt}(k)$ is obtained at time instant k, which comprises the optimized control input action $u_{opt}(k)$ at time instant k.

Only this first piece $u_{opt}(k)$ of the optimized control input profile may be implemented in a moving horizon fashion. The optimized firing angle 44 may be distributed as reference values to the firing logic stages 66.

At the next sampling instant, the whole procedure may be repeated starting with step 1.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 10 electrical drive system
12 electrical converter
14 electrical machine
16 electrical grid
18 transformer
20 excitation system
24 drive shaft
26 machinery
28 line side bridge
30 DC link
32 inductances
34 machine side bridge
36 three-phase bridge, twelve-pulse bridge
36a first three-phase bridge, six-pulse bridge
36b second three-phase bridge, six pulse bridge
38 thyristor arm
10 phase leg
R phase
S phase
T phase
Rp thyristor of positive arm of phase leg
Sp thyristor of positive arm of phase leg
Tp thyristor of positive arm of phase leg
Rn thyristor of negative arm of phase leg
Sn thyristor of negative arm of phase leg
Tn thyristor of negative arm of phase leg
42 commutation time window
44 firing angle
46 recovery time window
48 controller
50 speed controller stage
52 actual speed
54 reference speed
56 reference for a firing angle determination stage
58 firing angle determination stage
60 excitation controller stage
62 phase voltage measurements
64 firing angle determination stage
68 firing logic stage
70 firing signals
72 upper bound determination stage 74 DC link current measurements
76 upper bound
78 commutation inductance

The invention claimed is:

1. A method for switching a thyristor bridge of an electrical converter, the thyristor bridge being connected to at least one DC link and comprising at least one phase leg for each output phase of the electrical converter and each phase leg being composed of two series-connected thyristor arms, wherein the thyristor arms of the thyristor bridge are cyclically switched by the method comprising:
   determining an upper bound for a firing angle of the thyristor bridge, wherein the upper bound is determined from voltage and current measurements;
   determining the firing angle for the thyristor bridge, which firing angle determines a switching time of the thyristor arms, wherein the firing angle is determined, such that it is less or equal to the upper bound;
   wherein the upper bound for the firing angle is determined, such that the upper bound together with a time window, which is at least a sum of a commutation time window and a recovery time window of a thyristor arm of the thyristor arms, is less or equal to 180° and that the time window is less or equal 360° divided by a number of cyclically switched thyristor arms;
   wherein the firing angle is determined based on model predictive control, by:
      receiving a reference for a DC link current and/or a drive torque;
      predicting future states of the electrical converter as a function of future inputs with a mathematical model of the electrical converter, wherein the future inputs comprise future firing angles of the thyristor arm;
      determining the firing angle by minimizing an objective function, which is a function of the reference, the future states and/or the future inputs.

2. The method of claim 1, wherein the commutation time window and/or the recovery time window are dependent on the firing angle;
   wherein the upper bound is maximized, such that the upper bound together with the time window is less or equal to 180° and that the time window is less or equal 360° divided by the number of cyclically switched thyristor arms.

3. The method of claim 2, wherein the commutation time window depends from at least one of a phase-to-phase voltage between output phases of the electrical converter, a DC link current and the firing angle; and/or
   wherein the recovery time window depends on at least one of a change in a DC link current, a change of a voltage applied to the thyristor arm during switching, and/or a thyristor junction temperature.

4. The method of claim 1, wherein the firing angle for a thyristor arm is determined by setting the firing angle to the determined upper bound for the firing angle.

5. The method of claim 1, which further comprises determining an unbounded firing angle based on measurements in the electrical converter, wherein the unbounded firing angle is determined independently from the upper bound;
   setting the firing angle to a minimum of the unbounded firing angle and the upper bound.

6. The method of claim 1, which further comprises determining the firing angle based on measurements in the electrical converter and the upper bound;
   wherein the upper bound is a constraint for determining the firing angle.

7. The method of claim 1, wherein the objective function is minimized with a quadratic programming solver;
   wherein the upper bound for the firing angle is used as a constraint for the quadratic programming solver.

8. The method of claim 1, wherein after determination of the upper bound, the upper bound is reduced by a safety margin.

9. The method of claim 1, wherein phase voltages of the electrical converter are measured and a duration of a commutation time window for a thyristor arm is determined from changes in the phase voltages;
   wherein the upper bound for the firing angle is determined based on the determined commutation time window.

10. The method of claim 1, wherein phase voltages of the electrical converter are measured and a commutation inductance is determined from the measured phase voltages;
    wherein the upper bound for the firing angle is determined based on the determined commutation inductance.

11. The method of claim 2, wherein the firing angle for a thyristor arm is determined by setting the firing angle to the determined upper bound for the firing angle.

12. The method of claim 2, which further comprises determining an unbounded firing angle based on measurements in the electrical converter, wherein the unbounded firing angle is determined independently from the upper bound;
    setting the firing angle to a minimum of the unbounded firing angle and the upper bound.

13. The method of claim 2, which further comprises determining the firing angle based on measurements in the electrical converter and the upper bound;
    wherein the upper bound is a constraint for determining the firing angle.

14. The method of claim 2, wherein the objective function is minimized with a quadratic programming solver;
    wherein the upper bound for the firing angle is used as a constraint for the quadratic programming solver.

15. A controller for an electrical converter, wherein the controller is adapted for switching a thyristor bridge of the electrical converter, the thyristor bridge being connected to at least one DC link and comprising at least one phase leg for each output phase of the electrical converter and each phase leg being composed of two series-connected thyristor arms, wherein the thyristor arms of the thyristor bridge are cyclically switched by the controller operable to:
    determine an upper bound for a firing angle of the thyristor bridge, wherein the upper bound is determined from voltage and current measurements;
    determine the firing angle for the thyristor bridge, which firing angle determines a switching time of the thyristor arms, wherein the firing angle is determined, such that it is less or equal to the upper bound:
    wherein the upper bound for the firing angle is determined, such that the upper bound together with a time window, which is at least a sum of a commutation time window and a recovery time window of a thyristor arm of the thyristor arms, is less or equal to 180° and that the time window is less or equal 360° divided by a number of cyclically switched thyristor arms;
    wherein the firing angle is determined based on model predictive control, by:
       receiving a reference for a DC link current and/or a drive torque;
       predicting future states of the electrical converter as a function of future inputs with a mathematical model of the electrical converter, wherein the future inputs comprise future firing angles of the thyristor arm;

determining the firing angle by minimizing an objective function, which is a function of the reference, the future states and/or the future inputs.

16. The controller of claim 15, comprising:
an upper bound determination stage adapted for determining the upper bound based on measurements in the electrical converter;
a firing angle determination stage adapted for determining the firing angle based on measurements in the electrical converter.

17. An electrical drive system, comprising:
a line side bridge for rectifying an input multi-phase current;
a machine side bridge for generating an output multi-phase current;
at least one DC link interconnecting the line side bridge and the machine side bridge;
a controller according to claim 15;
wherein the line side bridge and/or the machine side bridge are a thyristor bridge;
wherein the controller is adapted for controlling the line side bridge and/or the machine side bridge.

18. The electrical drive system of claim 17, wherein the line side bridge and/or the machine side bridge comprise two or more three-phase bridges.

* * * * *